United States Patent Office 2,924,442
Patented Feb. 9, 1960

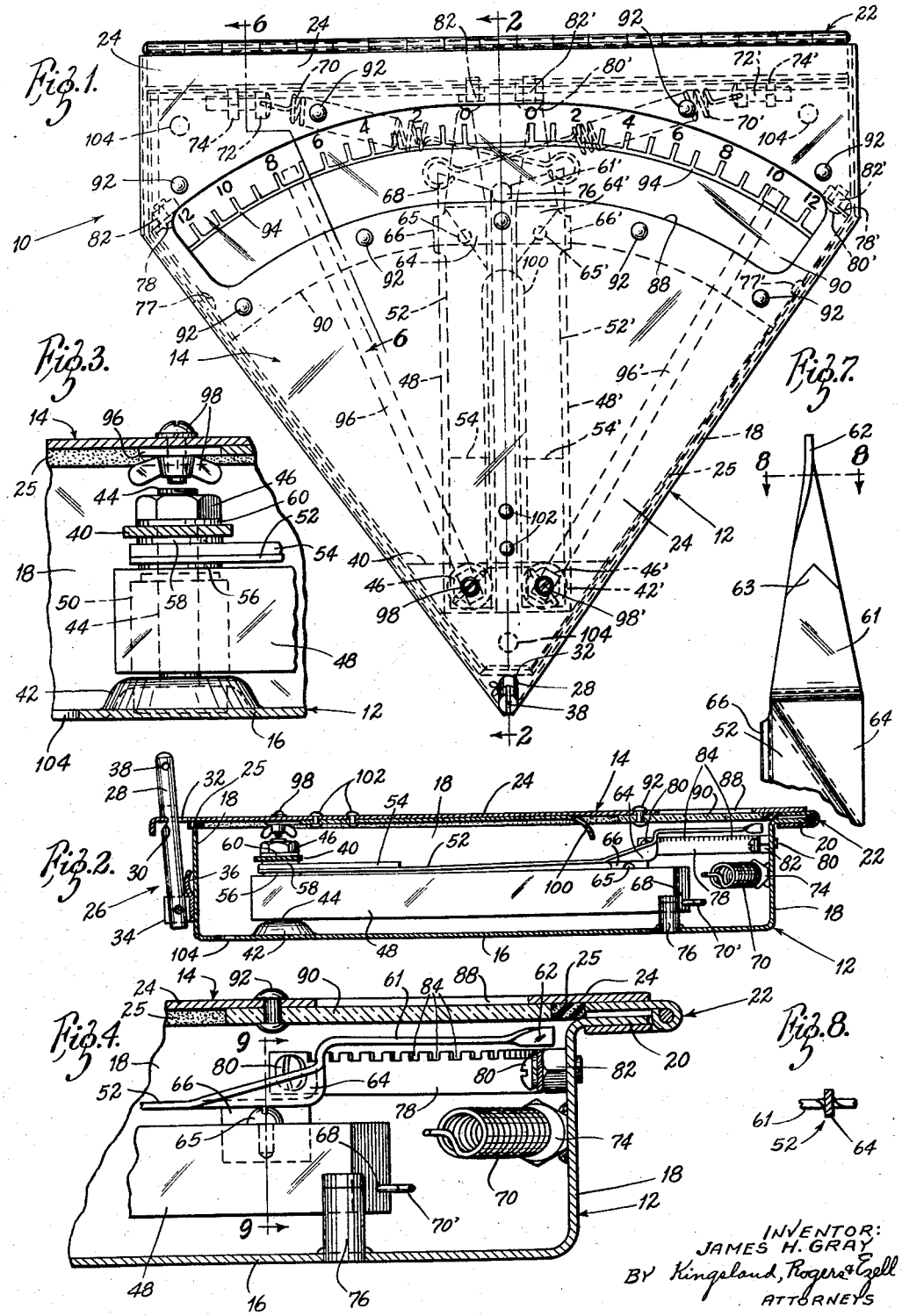

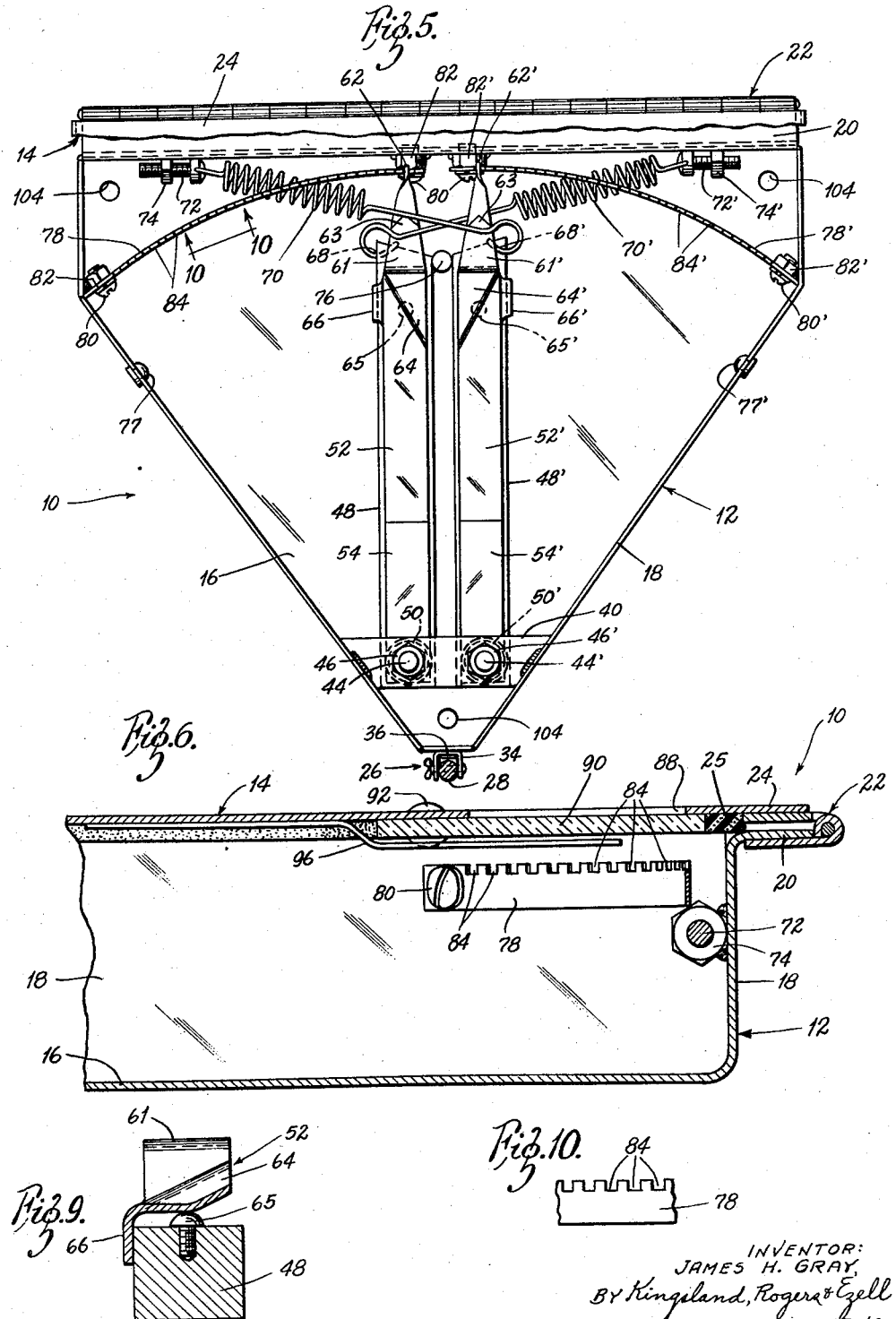

2,924,442

IMPACT METER

James H. Gray, Clayton, Mo., assignor to G & H Engineering Corporation, Clayton, Mo., a corporation of Missouri Application August 13, 1954, Serial No. 449,612

6 Claims. (Cl. 264—1)

The present invention relates generally to measuring devices, and more particularly to a novel impact meter adapted to register the maximum accelerations and decelerations to which the meter is subjected.

Devices of the general type here considered find particular application in the shipment by common carrier of fragile articles, goods, materials, and the like. Inasmuch as such shipments have in the past suffered damage which has been attributed to avoidable rough handling, it has become desirable to provide means for indicating with suitable accuracy the treatment to which particular shipments are subjected between acceptance and delivery thereof.

Hence, the device of the present invention is in the form of a meter adapted to accompany a particular shipment and to measure accelerations and decelerations imparted thereto. The accelerations are measured by inertial action of weight arms movably mounted within the meter case, uniformity of successive measurements being insured through return of the weight arms to a zero position after each departure therefrom. Suitable pointers are provided for indicating the maximum accelerations sustained in the interval during which the meter is left unattended. An appropriate scale is provided for interpreting the displacement of these pointers, and manually movable markers are also provided for indicating the maximum allowable acceleration for a given type of shipment.

It is an object of the present invention to provide a novel device for indicating the occurrence of rough treatment in connection with the handling of a particular shipment.

It is another object of the invention to provide a novel device of the type described which indicates the maximum degree of roughness of treatment imparted to a particular shipment.

It is another object of the invention to provide a novel meter for measuring accelerations and decelerations imparted to a particular shipment and for indicating the maximums thereof.

Further objects of the invention are to provide a novel impact meter which is simple and efficient in its design, which is fundamentally rugged in its construction, which is dependable and accurate in its operation, and which is otherwise well suited for its intended use.

The foregoing and additional objects and advantages will be apparent from the following description taken in conjunction with the accompanying drawings, in which:

Figure 1 is a front elevational view of an impact meter constructed in accordance with the teachings of the present invention;

Figure 2 is a sectional view taken generally along the line 2—2 of Figure 1;

Figure 3 is an enlarged fragmentary sectional view showing, with added detail, a portion of the device as depicted adjacent the left end of Figure 2;

Figure 4 is an enlarged fragmentary sectional view showing, with added detail, a portion of the device as depicted at the right end of Figure 2;

Figure 5 is a plan view similar to Figure 1, but with a portion of the cover broken away so as to reveal additional internal structure;

Figure 6 is an enlarged fragmentary sectional view taken generally along the line 6—6 of Figure 1;

Figure 7 is a fragmentary plan view showing the free end of a removed pointer;

Figure 8 is a sectional view taken along the line 8—8 of Figure 7;

Figure 9 is a sectional view taken generally along the line 9—9 of Figure 4; and Figure 10 is a fragmentary view taken generally along the line 10—10 of Figure 5.

Referring more particularly to the drawings through use of the reference numerals applied thereto, the numeral 10 designates generally an impact meter which conforms to the teachings of the present invention. The meter 10 comprises a box or tray-like case 12 provided with a hinged cover 14. Preferably, the case 12 and cover 14 take the plan forms depicted in Figures 1 and 5, although this is not, of course, a requirement of the invention.

Considering Figures 2 and 5, it will be noted that the case 12 comprises a bottom or back wall 16 and a peripheral upstanding side wall 18. This side wall 18 is provided with an outturned flange 20 only along its rear or upper edge, and it is to this flange 20 that a hinge assembly 22 is secured. The hinge 22 is also secured to a plate 24 which forms the main structural element of the cover 14. A resilient gasket 25 is cemented to the underside of the plate 24 for abutment with the top edge of the side wall 18.

In addition to the hinge 22 which joins the case 12 and the cover 14, an automatic latch assembly 26 is provided for securing the cover 14 in closed position relative to the case 12. As best shown in Figures 2 and 5, the latch assembly 26 may comprise a simple pivoted latch rod 28 having a notch 30 for engaging the plate 24 when the free end of the rod 28 is projected through a hole 32 formed in the plate 24. The illustrated pivotal attachment of the present rod 28 comprises a clip 34 having a spring extension 36 for biasing the notch 30 into engagement with the plate 24. Preferably, the free end of the rod 28 is slotted and provided with a cross pin 38, this for a purpose to appear.

A strip-like shelf 40 is secured horizontally between opposite portions of the side wall 18 as shown in Figure 5, this shelf 40 being predeterminately spaced above the lower wall 16, as best shown in Figure 3. The latter figure also clearly shows a deformed boss 42 impressed in the bottom wall 16 directly beneath the shelf 40, and it will be understood that an identical boss 42′ (Figure 5) is formed beside the boss 42 and also directly beneath the shelf 40. In connection with the bosses 42 and 42′, it may be mentioned that these deformities are spaced equidistantly on opposite sides of a medial line, such as the section line 2—2, running from top to bottom of the meter 10. Furthermore, as is evident from Figures 1 and 5 of the drawings, the meter 10, including component elements thereof as yet unmentioned, comprises an arrangement which is substantially symmetrical about this medial line.

Considering the symmetry of arrangement of the meter 10 and considering further that certain of the operative elements therein comprise duplicate structure, it is deemed necessary to describe but one of each of these duplicated assemblies. Hence, it will be understood that elements shown in the drawings which are designated by primed reference numerals may be considered to be mirfor images of the elements designated by the corresponding unprimed numeral.

Referring once more then to the boss 42 and the shelf 40, it will be observed that these elements are apertured so as to receive a bolt 44, the head of the bolt 44 occupying the depression formed by the boss 42 and the free end of the bolt 44 extending above the shelf 40 and being provided with a nut 46. A weight arm 48, preferably constructed of a relatively heavy metal to provide substantial mass, is provided at one end with a bearing assembly 50 by means of which the weight arm 48 is adapted to pivot freely about the axis of the bolt 44.

The bolt 44 also provides pivotal attachment for a pointer 52 provided with a reinforcing plate 54 at its pivoted end. As clearly shown in Figure 3, the weight arm 48 and the pointer 52 are both disposed between the boss 42 and the shelf 40. They are separated from each other and from the shelf 40 by means of washers 56 and 58. In addition, a washer 60 is provided between the shelf 40 and the nut 46. The assembly is such that, in addition to the weight arm 48 being able to pivot freely on its bearing assembly 50, the pointer 52 may also be pivoted about the same axis.

The free end of the pointer 52 is formed as clearly shown in Figure 2, so as to present a raised or elevated flat portion 61 and, therebeyond, a vertical terminal portion 62. A preferred shape of this terminal portion 62 is depicted in Figures 7 and 8. In the illustrated pointer 52, the upper surface of the elevated portion 61 is painted with fluorescent paint to provide a luminous point 63.

The transition between the main body of the pointer 52 and the elevated portion 61 thereof is shown best in Figures 4, 7 and 9. From these figures, it will be noted that the transition includes an oblique inclined portion 64 adapted for slidable engagement with a rounded protrusion 65 formed as a part of the weight arm 48. It will be understood that the pointer 52 is constructed of resilient material and that it is so disposed relative to the arm 48 as to cause its free end to be lifted upon appropriate sliding engagement between the portion 64 and the protrusion 65. The pointer 52 also includes a depending tab 66 for abutting engagement with the weight arm 48, and it will be further understood that the relation of these parts is such that engagement between the tab 66 and the arm 48 may only occur after the free end of the pointer 52 has been lifted as aforementioned through sliding engagement between the inclined portion 64 and the protrusion 65.

The free end of the weight arm 48 is provided with an aperture 68 which receives one end of a tension spring 70. The spring 70 has a predetermined spring rate, in addition to which its other end is hooked into the head of a screw 72 which is adjustable in a nut 74 secured, as by welding, to the vertical wall 18 as clearly indicated in Figures 2 and 5. Thus disposed, the spring 70 predeterminately biases the weight arm 48 toward abutment with a centrally located post 76, secured in upstanding relation to the lower wall 16. It will be noted that this post 76 is disposed upon the previously mentioned medial line of the meter 10 and, hence, is engageable by the illustrated weight arm 48', as well as by the weight arm 48. Maximum departures of the arms 48 and 48' from the post 76 are limited by rivet stops 77 and 77', respectively.

A detent element 78 is secured in the case 12 adjacent the free end of the pointer 52. This detent element 78 is disposed in an arc having the bolt 44 at its center and, thus disposed, is secured in the case by means of screws 80 and nuts 82, the later being welded to the side wall 18, as best shown in Figure 5. One edge of the ratchet 78 is provided with generally rectangular notches 84 (Figure 10), any of which may receive the vertical portion 62 of the pointer 52 so as to retain the latter in various positions to which it may be moved in the as yet to be described operation of the meter 10. As will be more fully described hereinafter, the pointer 52 is subject to displacement under the action of the weight arm 48, these pivoted elements being movable about the axis of the bolt 44, as has been previously indicated.

Directing attention now once more to the cover 14, the plate 24 thereof has an arcuate cut-out or window opening 88. A panel or pane 90 of transparent material closes the opening 88 and is secured by means of rivets 92. Preferably, the pane 90 is marked, in any appropriate manner, such as etching, painting, or the like, to provide a dual scale 94.

The cover 14 includes two indicators or markers 96 and 96', and it will be noted from Figures 1, 2 and 3 that these markers are pivotally mounted to the plate 24 by means of screw and wingnut assemblies 98 and 98', respectively. It will further be noted from these same figures that the fastening assemblies 98 and 98' are located so as to be on the extended axes of the bolts 44 and 44' when the cover 14 is in closed position. Thus mounted, the markers 96 and 96' are adapted for manual movement by means of which their free ends may be disposed at selected points along the scale 94. Figure 6 shows how the marker 96 may be bent so as to clear the pane 90. Preferably, the extreme free ends of the markers 96 and 96', which are visible through the pane 90, are distinctively colored.

The meter 10 is provided with a spring clip 100 which takes the form clearly shown in Figures 1 and 2 and which is secured to the underneath surface of the plate 24 by means of rivets 102.

In use, the impact meter 10 is normally mounted with the bottom wall 16 of the case 12 in a vertical position, although this is not essential to the operation of the device. It is essential, however, that the meter 10 be mounted so that the plane of pivotal movement of the weight arms 48 and 48' will be parallel to the direction in which critical force impulses may be expected. For example, for shipments in railway box cars, a meter 10 might very well be secured to the side of the box car where it will be effective to register the maximum longitudinal bumps or force impulses to which the box car is subjected. It will be noted that the wall 16 of the case 12 is provided with mounting holes 104 for thus mounting the meter 10. It is not, of course, required that the meter 10 be mounted on a shipping vehicle; it may be preferred in certain instances to mount it directly on a box or crate which is being shipped.

Wherever mounted, however, it is obvious that impact forces which are effective to induce substantial accelerations of the meter 10 parallel to the wall 16 will result in momentary displacement of at least one of the arms 48 and 48'. To be more specific, and considering the views of Figures 1 and 5, it is clear that a substantial acceleration of the meter 10 to the right will, through inertia, effect pivotal movement of the weight arm 48 in a counterclockwise direction against the action of the spring 70. Inasmuch as the depicted relationship between the arm 48 and the pointer 52 shows the protrusion 65 to be already supporting the vertical terminal portion 62 in a position which clears the notches 84 of the detent element 78, it is also evident that the weight arm 48 will act through the depending tab 66 to displace the pointer 52 through an equal arc. Upon completion of its counterclockwise pivotal movement, the arm 48 will be immediately returned to its zero position by action of the spring 70. The pointer 52, on the other hand, will remain in the position to which it was deflected and, due to the protrusion 65 being now withdrawn, the terminal portion 62 is free to spring into an appropriate notch 84 and thus effectively to maintain the pointer 52 against unwanted movement in either direction.

If, subsequently, a similar acceleration, but one of greater magnitude, should be sustained by the meter 10, the weight arm 48 will be caused to pivot a greater distance from its zero position. As the arm 48 approaches engagement with the tab 66, however, the protrusion 65 thereon will first engage the inclined portion 64 of the pointer 52 and cause the terminal portion 62 to be lifted once more clear of the notches 84. Thus, the pointer 52 is free to be moved from a previously established position so as to correspond with this greater departure of the weight arm 48 from its zero position Should the meter 10, while moving at constant speed to the right, as viewed, experience a substantial deceleration, it is, of course, obvious that the weight arm 48 would remain against the post 76 and the weight arm 48' would be momentarily displaced in clockwise pivotal movement, which would result in the pointer 52' being positioned in corresponding clockwise displacement. It is further obvious that accelerations and decelerations of the meter 10 in a left hand direction will result in correspondingly similar movements of the weight arms 48 and 48' and pointers 52 and 52'.

The markers 96 and 96', as pointed out before, may be set manually so as to indicate a critical acceleration for a given load or shipment. The acceleration or deceleration assumed to be critical may be different in opposite directions, which case is illustrated by the setting of the markers 96 and 96' in Figure 1.

The spring clip 100 is provided for conveying appropriate notes or information relating to the operation or calibration of the meter 10, or in reference to particular shipments.

It will be noted that the latch assembly 26 which closes the meter 10 is such that, by provision of the aforementioned slot in the rod 28, it can be sealed shut by insertion of a standard railroad box car locking seal or similar device, so as to eliminate the likelihood of the meter 10 being tampered with or reset by unauthorized persons.

Clearly, there has been provided an impact meter which fulfills the objects and advantages sought therefor.

It is to be understood that the foregoing description and the accompanying drawings have been given only by way of illustration and example. It is further to be understood that changes in the form of the elements, rearrangement of parts, or substitution of equivalent elements, all of which will be readily apparent to one skilled in the art, are contemplated as within the scope of the present invention, which is limited only by the claims which follow.

What is claimed is:

1. A device for registering maximum accelerations or decelerations of a movable structure, said device comprising a rigid case adapted for securement to said movable structure, said case being provided with stop means centrally thereof, a pair of inertia elements mounted in said case for independent movement in a common plane, means resiliently biasing said elements in opposite directions toward respective zero positions defined by said stop means, indicating means for each of said elements, said indicating means each including a pointer mounted for independent displacement in correspondence with its respectively associated inertia element, and means for retaining said pointers in successively displaced positions uninfluenced by return movement of the inertia element to zero position.

2. The device of claim 1 wherein the case is provided with a dual scale having separate coplanar portions for individual cooperation with said pointers, said scales extending in opposite directions from the vicinity of the stop means, and a manually movable marker for each scale for indicating selected limits of allowable acceleration or deceleration.

3. The meter of claim 1, in which the pointer is displaced in a fixed path in a plane, and has a portion normally yieldably urged in one direction, and in which the pointer-retaining means comprises detent means adjacent the pointer portion with which the pointer portion is normally urged, as aforesaid, into engagement; interengaging parts on the pointer and its inertia element that displace the pointer portion away from its detent means when the pointer and element are together, means on the inertia element to engage the pointer for one way displacement of the pointer by the inertia element, with the parts together, the said means releasing the pointer portion for movement into engagement with the detent means, when the inertia element is returned toward the stop means.

4. The meter of claim 3 wherein the detent has serrations to prevent movement of the pointer in either direction.

5. The meter of claim 3 wherein the interengaging means includes a camming mechanism.

6. An impact meter comprising an inertia element swingably mounted to move from a starting position in response to changes in velocity of a vehicle or the like, a pointer mounted for movement adjacent to the inertia element, the pointer being adapted to be displaced in a fixed path in a plane, and having a portion normally yieldably urged in one direction, pointer retaining means comprising detent means adjacent to the pointer portion with which the pointer portion is normally urged into engagement; means comprising interengaging parts on the pointer and its inertia element to displace the pointer portion away from its detent means when the pointer and element are together, means on the inertia element to engage the pointer for one way displacement of the pointer by the inertia element, with the parts together, the said means releasing the pointer when the inertia element is returned toward the starting position, and separating the interengaging parts of the means to displace the pointer portion, to enable the pointer portion to engage the detent means.

References Cited in the file of this patent

UNITED STATES PATENTS

| | | |
|---|---|---|
| 1,104,424 | Jansen | July 21, 1914 |
| 1,368,941 | Klein | Feb. 15, 1921 |
| 1,624,219 | Cowdrey | Apr. 12, 1927 |
| 1,801,878 | Petersen | Apr. 21, 1931 |
| 1,924,658 | Sanders | Aug. 29, 1933 |
| 2,156,085 | Dardani | Apr. 25, 1939 |
| 2,157,514 | Whipple | May 9, 1939 |
| 2,262,007 | Kollsman | Nov. 11, 1941 |
| 2,293,234 | Winter | Aug. 18, 1942 |

FOREIGN PATENTS

| | | |
|---|---|---|
| 278,237 | Germany | Sept. 24, 1914 |